(12) United States Patent
Stone et al.

(10) Patent No.: US 11,437,040 B1
(45) Date of Patent: Sep. 6, 2022

(54) MODIFYING COMMUNICATION CHANNEL INTERACTIONS BASED ON REAL-TIME EVENT TRACKING

(71) Applicant: UIPCO, LLC, San Antonio, TX (US)

(72) Inventors: Matthew Patrick Stone, San Antonio, TX (US); Zachary Taylor Pingel, San Antonio, TX (US); Boyd Alan Hutton, Fair Oaks Ranch, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 468 days.

(21) Appl. No.: 16/530,718

(22) Filed: Aug. 2, 2019

Related U.S. Application Data

(60) Provisional application No. 62/714,240, filed on Aug. 3, 2018.

(51) Int. Cl.
| | |
|---|---|
| *H04L 29/06* | (2006.01) |
| *G10L 15/26* | (2006.01) |
| *H04L 51/02* | (2022.01) |
| *H04M 3/493* | (2006.01) |
| *G06F 9/451* | (2018.01) |

(52) U.S. Cl.
CPC ............. *G10L 15/26* (2013.01); *G06F 9/453* (2018.02); *H04L 51/02* (2013.01); *H04M 3/4938* (2013.01)

(58) Field of Classification Search
CPC ......... G10L 15/26; G10L 15/22; G06F 9/453; H04L 51/02; H04M 3/4938; H04M 3/5183
USPC ....................................................... 704/275
See application file for complete search history.

(56) References Cited

U.S. PATENT DOCUMENTS

| | | | |
|---|---|---|---|
| 10,074,369 B2 * | 9/2018 | Devaraj | G10L 15/22 |
| 10,469,664 B2 * | 11/2019 | Pirat | H04M 3/5183 |

* cited by examiner

*Primary Examiner* — Md S Elahee
(74) *Attorney, Agent, or Firm* — Perkins Coie LLP

(57) ABSTRACT

Various embodiments of the present disclosure relate generally to providing services to users via communication channels. More specifically, various embodiments of the present disclosure relate to systems and methods for modifying, updating, and/or changing communication channel interactions based on the tracking or listening for events within other communication channels.

20 Claims, 8 Drawing Sheets

MODIFYING COMMUNICATION CHANNEL INTERACTIONS BASED ON REAL-TIME EVENT TRACKING

CROSS-REFERENCE TO RELATED APPLICATIONS

This application is a non-provisional of and claims priority to U.S. Provisional Application No. 62/714,240, filed on Aug. 3, 2018, entitled "MODIFYING COMMUNICATION CHANNEL INTERACTIONS BASED ON REAL-TIME EVENT TRACKING," which is hereby incorporated by reference in its entirety for all purposes.

TECHNICAL FIELD

Various embodiments of the present disclosure relate generally to server-based transactions. More specifically, various embodiments of the present disclosure relate to methods and systems for modifying, updating, and/or changing communication channel interactions based on the tracking or listening for events within other communication channels.

BACKGROUND

Companies and other entities often provide multiple services and products to their customers, clients, subscribers, members, or other users. For example, a large company (or group of companies) that provides business or financial services to members may manage a member's bank accounts, insurance policies, credit card accounts, brokerage accounts, and so on. As another example, a large online retailer may sell physical products to a customer, provide online content to the customer, and so on. Further, a technology company may manage and provide to a customer some or all of the hardware, software, and online computing resources and products utilized by the customer in his/her daily life.

By providing such a large, diverse group of services to customers, these companies acquire, store, track, and maintain large sets of data (e.g. real-time, near real-time, and historical data) associated with the customers. For example, a company may obtain and store data for a customer each time the customer interacts with one or more services provided by the company. However, companies often do not maximize the value or benefits associated with the acquisition of such large amounts of customer-associated data.

BRIEF DESCRIPTION OF THE DRAWINGS

Embodiments of the present disclosure will be described and explained through the use of the accompanying drawings in which.

DETAILED DESCRIPTION

Overview

Figure 1:
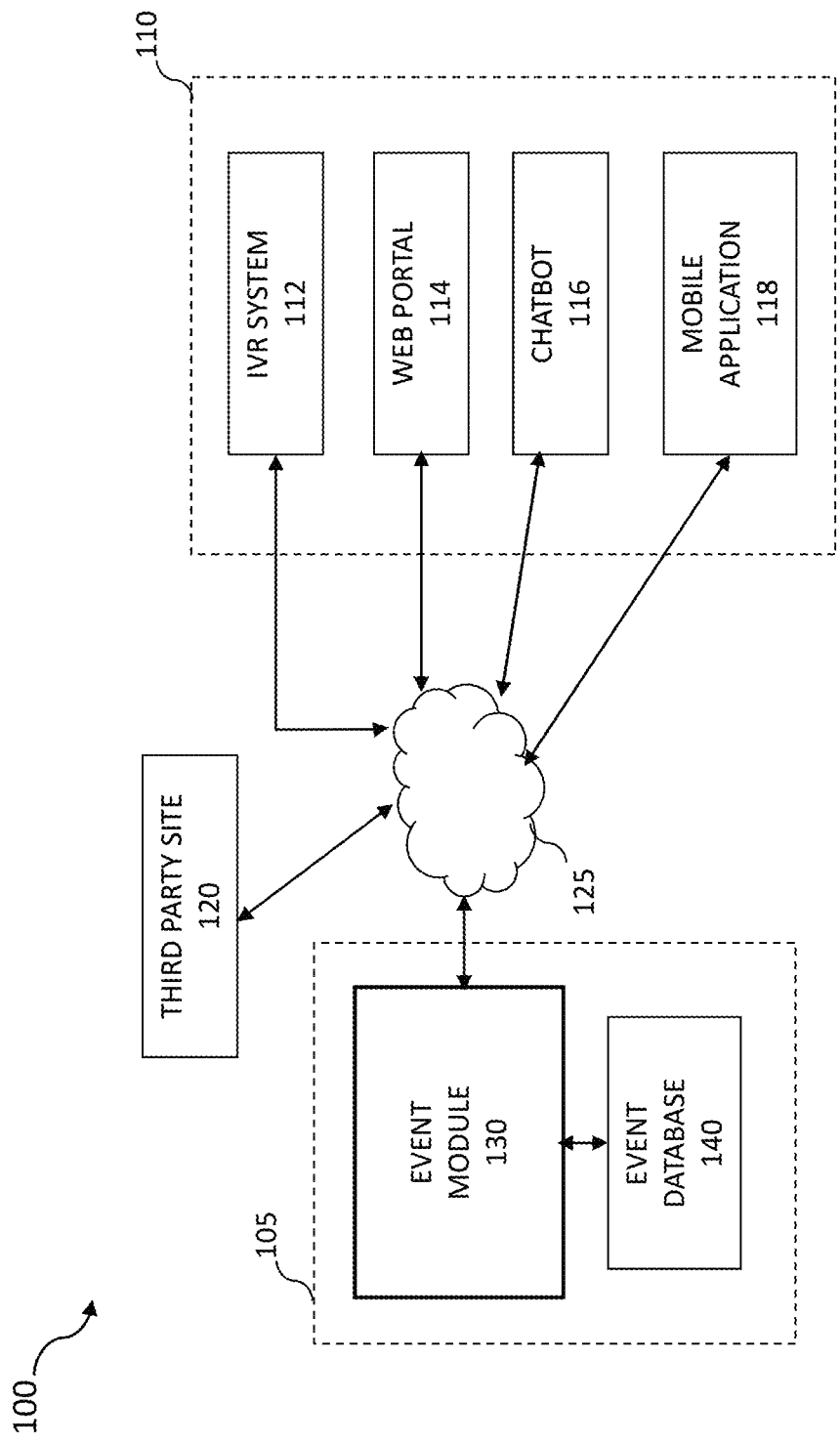
FIG. 1 illustrates an example of a network-based operating environment in accordance with various embodiments of the present disclosure.

Various embodiments of the present disclosure relate generally to providing services to users via communication channels. More specifically, various embodiments of the present disclosure relate to systems and methods for modifying, updating, and/or changing communication channel interactions based on the tracking or listening for events within other communication channels.

For example, the systems and methods may interact with a user via one communication channel (e.g., an Interactive Voice Response, or IVR, channel), and listen for events during the interaction. An event may be an action (e.g., spoken word or phrase) that occurred during the interaction. While listening, the systems and methods capture events in real-time as they occur. Once captured, the systems and methods compare context information associated with the events, and compare the context information to events occurring in real-time (or near real-time) within other communication channels (e.g., online web portals or mobile applications) via which the user is also interacting.

The systems and methods may then share the captured context information with the other communication channels, and may dynamically modify or adjust the interactive experiences for the user with any of the communication channels, based on the occurrences of real-time events at or within other channels. Thus, the system and methods may perform cross channel interaction modifications in real-time based on events occurring in one or more channels of an organization or system.

In some embodiments, the systems and methods described herein include a server associated with an entity that provides products or services to members (e.g., clients, subscribers, customers, and/or other users), where the server is configured to manage and modify member interactions within different communication channels based on real-time events occurring within the channels.

For example, the server may identify, in real-time, an event within a first communication channel provided by the server to facilitate interactions between a member of the entity and an interactive system of the entity, receive a member identifier for the member and context information associated with the event at the server, match the member identifier and the context information with events associated with the member within a second, different, communication channel, obtain data associated with the events within the second communication channel, and modify, in real-time, the interactions between the member of the entity and the interactive system within the first communication channel based on the obtained data for the events within the second communication channel.

Thus, in some embodiments, the systems and methods enable companies and other entities to enhance the experiences of their members and users based on the data they create, track, and store on behalf of their members, by modifying and/or optimizing various interactive systems employed by the entities to facilitate interactions with the members. These interactive systems (e.g., IVR systems, chatbots, web or online portals, automated processes, and so on), may adjust how and what they present to members during interactions in real-time and based on events occurring with respect to other interactive systems. The methods and systems, therefore, enhance the functionality of the computing resources (e.g., interactive systems) large entities utilize and deploy to interact with members and users, such as to present information to members, receive information from members, create business objects for members, provide services or products to users, and so on.

For purposes of explanation and illustration, the terms "application" and "application program" are generally synonymous. Further, these terms are applicable to applications running on any kind of device (e.g., a desktop application running on a desktop computer or on a laptop computer). Similarly, a "mobile application" applies to software running on mobile devices. Accordingly, such distinctions will be understood to be clear from the context of usage of the terms "application" or "application program." Additionally, for discussion purposes herein, the terms "entity" and "organization" are considered synonymous. In the following description, for the purposes of explanation, numerous specific details are set forth in order to provide a thorough understanding of embodiments of the present disclosure. However, it will be apparent on reading the disclosure to one skilled in the art that embodiments may be practiced without some of these specific details.

Moreover, the techniques introduced here can be embodied as special-purpose hardware (e.g., circuitry), as programmable circuitry appropriately programmed with software and/or firmware, or as a combination of special-purpose and programmable circuitry. Hence, embodiments may include a machine-readable medium having stored thereon instructions that may be used to program a computer (or other electronic devices) to perform a process. The machine-readable medium may include, but is not limited to, floppy diskettes, optical discs, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other type of medium/machine-readable medium suitable for storing electronic instructions, such as non-transitory computer-readable media.

Examples of the Network Environment

As described herein, in some embodiments, the systems and methods, relate to modifying, updating, and/or changing communication channel interactions between users and interactive systems based on the tracking or listening for events (in real-time) within other communication channels associated with the users. FIG. 1 illustrates an example of a network-based operating environment 100 in accordance with various embodiments of the present disclosure.

As illustrated in FIG. 1, the operating environment 100 may include multiple different communication channels 110 provided by an entity (e.g., company or organization), such as a server 105 or servers of the entity. The communication channels facilitate interactions between members, clients, customers, subscribers, or other users, and various different types of automated or interactive systems provided by the entity, such as via the server 105.

The communication channels 110 may include an interactive voice response (IVR) system 112 that facilitates voice communications between members and the entity, a web or online portal 114 that facilitates online communications (e.g., via presented web pages) between members and the entity, a chatbot 116 or other messaging system that facilitates message based communications between members and the entity, a mobile application 118 that facilitates online communications (e.g., via various interfaces of the mobile application), and so on.

Members and other users may access one or more of the communication channels using one or more computing devices (such as a mobile device; a mobile phone; a telephone; a tablet computer; a mobile media device; a mobile gaming device; a vehicle-based computer; a dedicated terminal; a public terminal, desktop, or laptop computer; a kiosk; wearable devices such as a smartwatch; a voice-based virtual device (e.g., "Alexa" or "Echo," and so on). In some embodiments, aspects of the communication channels may be stored on the one or more computing devices, or may be stored remotely on a server (in the "cloud"), such as server 105. These computing devices can include mechanisms for receiving and sending traffic by connecting through a network 125 to the server 105 or other remote systems or devices. Further, the server 105 may also receive information from various third-party sites associated with members of the entity, such as social media sites, other entities, and so on.

In some embodiments, the server 105 includes or provides an event module 130, which is configured to perform various processes for modifying and/or optimizing the various interactive systems employed by the entity in response to the tracking and matching of events within the communication channels 110, as described herein. The event module 130, which is described in more detail herein, may include or communicate with an event database 140, which may be part of the server 104 and/or accessible by the event module 130.

The event database 140, in some embodiments, stores information associated with events for members (and other users) of the entity. For example, the event database 140 may create, generate, update, and/or maintain entries for members that relate member identifiers to the members, events attributed to the members within the communication channels, context information for one or more events, and/or other activity information (e.g., security or authentication information) for members of the entity.

The network 125 can be any combination of local area and/or wide area networks, using wired and/or wireless communication systems. The network 125 can be, or could use, any one or more protocols/technologies: Ethernet, IEEE 802.11 or Wi-Fi, worldwide interoperability for microwave access (WiMAX), cellular telecommunication (e.g., 3G, 4G, 5G), CDMA, cable, digital subscriber line (DSL), etc. Similarly, the networking protocols used on network 125 may include multiprotocol label switching (MPLS), transmission control protocol/Internet protocol (TCP/IP), User Datagram Protocol (UDP), hypertext transfer protocol (HTTP), simple mail transfer protocol (SMTP), and file transfer protocol (FTP). Data exchanged over network 125 may be represented using technologies, languages, and/or formats, including hypertext markup language (HTML) or extensible markup language (XML). In addition, all or some links can be encrypted using conventional encryption technologies such as secure sockets layer (SSL), transport layer security (TLS), and Internet Protocol security (IPsec).

The databases and/or data stores, such as the event database 140, can be used to manage storage and access to user data such as member or user identifiers, user profiles; information relating to goods and services that are of interest to a user; user's financial and personal data; disclosures and compliance information reviewed, acknowledged, or signed by users; data received from third parties; one or more computer-generated keys or computer-generated codes communicated to users for authentication of calling parties involved in simultaneous voice and data communications with multiple parties over multiple electronic media including a variety of electronic devices; and other information. The data stores may be a data repository of a set of integrated objects that are modeled using classes defined in database schemas. The data stores may further include flat files that can store data.

Further, in some embodiments, the server 105, computing devices and/or communication channels (and associated interactive systems), may include one or more processors, an operating system, applications, and other components. Other embodiments of the technology may include some, all, or none of these modules and components, along with other modules, applications, and/or components. Still yet, some embodiments may incorporate two or more of these modules and components into a single module and/or associate a portion of the functionality of one or more of these modules with a different module.

The memory can store instructions for running one or more applications or modules on processor(s). For example, memory could be used in one or more embodiments to house all or some of the instructions needed to execute the functionality of operating system, application, and other modules. Generally, memory can include any device, mechanism, or populated data structure used for storing information. In accordance with some embodiments of the present disclosure, memory can encompass, but is not limited to, any type of volatile memory, nonvolatile memory (RAM), and dynamic memory. For example, memory can be random access memory, memory storage devices, optical memory devices, magnetic media, floppy disks, magnetic tapes, hard drives, single in-line memory modules (SIMMs), synchronous dynamic random access memory (SDRAM), dual in-line memory modules (DIMMs), Rambus dynamic random access memory (RDRAM), double data rate RAM (DDR RAM), small outline DIMMs (SODIMMs), EPROMs, EEPROMs, compact discs, DVDs, and/or the like. In accordance with some embodiments, memory 205 may include one or more disk drives, flash drives, one or more databases, one or more tables, one or more files, local cache memories, processor cache memories, relational databases, flat databases, and/or the like. In addition, those of ordinary skill in the art will appreciate many additional devices and techniques for storing information that can be used as memory.

Examples of Modifying Channel Interactions Based on Cross Channel Events

As described herein, the event module 130 (and associated database 140) may include various components configured to track and identify events, as well as cause changes to interactions within communication channels. For example, the event module 130 may include one or more event listeners configured to "listen" for occurrences of events within a communication channel.

The event listeners may identify a variety of different events. For example, an event may include a navigation action, such as one or more spoken words within the IVR system channel 112, one or more user actions (e.g. clicks, scrolls, text input, page launch or navigation, or other user input actions) within the web portal or page channel 114 or mobile application channel 118, and/or one or more messages (e.g., which may include keywords or other actionable words or phrases) input by the user within the chatbot channel 116. An event, therefore, may be defined by one or more business rules applied to user interactions within a communication channel.

Figure 2:
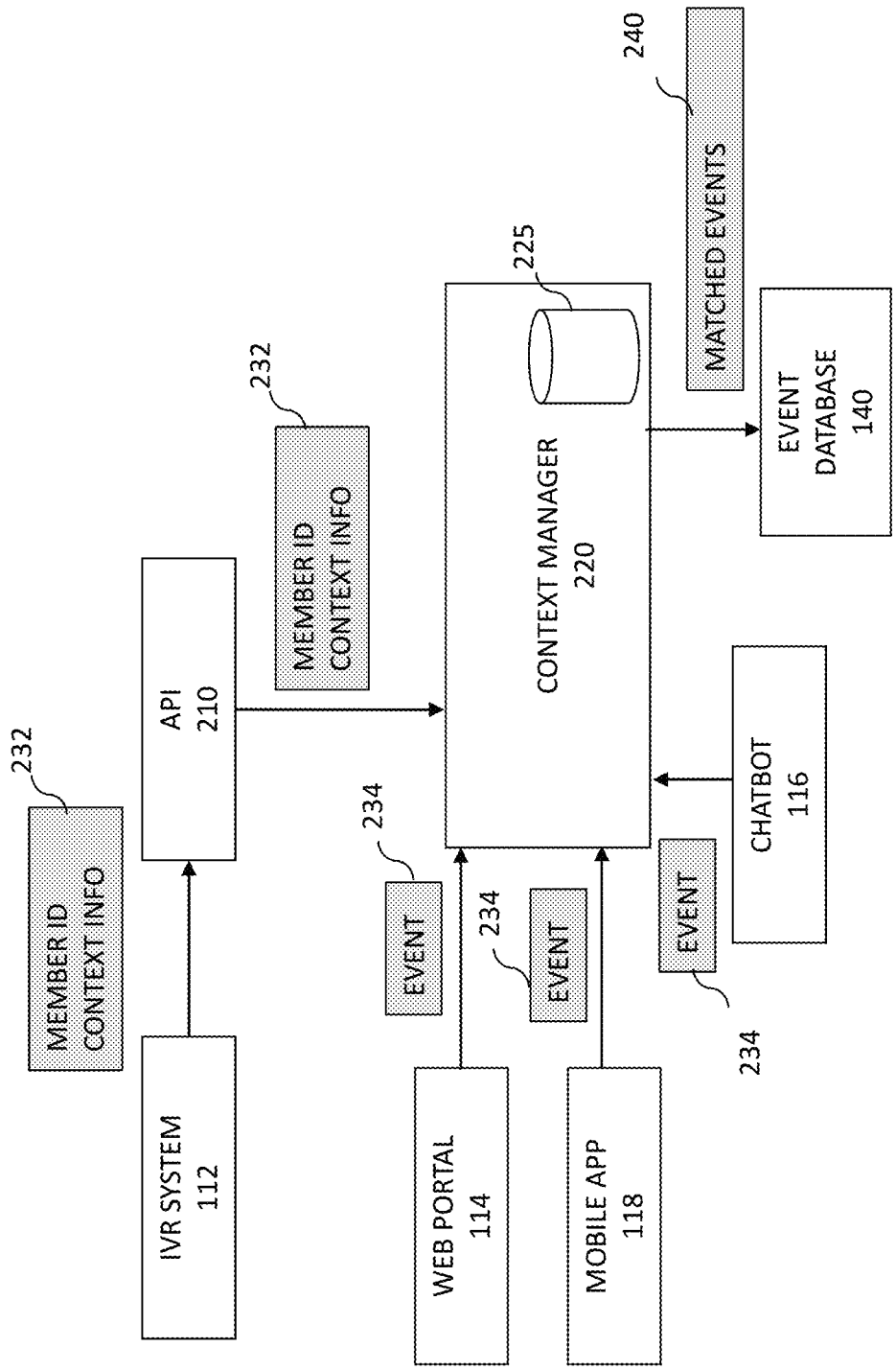
FIG. 2 illustrates various component interactions between communication channels and an event listener, in accordance with various embodiments of the present disclosure.

FIG. 2 illustrates various component interactions between communication channels and an event listener, in accordance with various embodiments of the present disclosure. Other embodiments of the present technology may include some, all, or none of these modules and components along with other modules, applications, and/or components. Still yet, some embodiments may incorporate two or more of these modules and components into a single module and/or associate a portion of the functionality of one or more of these modules with a different module.

A memory can be any device, mechanism, or populated data structure used for storing information, such as event or context information, or various aspects of the components described herein. The memory can store instructions for running one or more applications or modules on processor(s). For example, the memory could be used in one or more embodiments to house all or some of the instructions needed to execute the functionality of the event module 130, event listener, and so on.

A context manager 220 of an event listener (or event module 130) presents an application programming interface 210 via which the communication channels 110 may provide information (e.g., member identifiers, context information, event information, and so on) upon occurrences of events 234 within the channels.

For example, upon a real-time occurrence of an event (e.g., the user provides a voice request to change her address to another state) within the IVR system channel 112, the channel 112, via one or more associated computing devices, sends information 232 identifying the user (e.g., a member identifier) and context information for the event (e.g., "address change" or "change of member biographical information") to the context manager 220 by calling the API 210.

The information 232 may include an event notification having "log tag" information, such as a multipart string that identifies an interaction point (e.g., line of code or step in a process) within the communication channel in which the user is interacting with the server 105. The information 232 is then routed to the context manager 220 from the API 210.

The context manager 220 includes and/or accesses a context database 225, which may include information similar to the event information stored in event database 140. The context database 225 includes real-time usage data across all the communication channels the user interacts with when communicating with the server 105. For example, the context database 225, via the context manager 220, receives and stores event information (from event notifications) received from the web portal channel 114, the chatbot channel 116, the mobile application channel 118, and so on.

Further, the context manager 220, via the context database 225 or a separate data store, maintains a member table that includes member identifiers for all members of the entity. The member table may relate member identifiers to communication channels 110 associated with the members, events attributed to the members, products or services provided to the members, and so on. The context manager 220 matches event information to stored context information for a user, and stores the matched event data 240 to the event database 140

Using the matched event data 240 stored in the event database 140, the event module 130 (via one or more event listeners) may then cause various interactive systems of the communication channels 110 to dynamically modify interactions with a user. For example, a communication channel facilitating the entry of information for a user may access data provided by the user within a different channel and automatically populate various input fields with the provided information. As another example, one communication channel may invoke or introduce a new service to be provided to a user based on a navigation event identified in a different communication channel.

In some embodiments, the event module 130 may filter or otherwise pre-process all event information before the event information is accessible by the context manage 220. For example, the event module 130 may group event information into one or more pre-defined event topics (e.g., "address changes" or "all navigation changes" or "account updates").

The context manager 220 may access, utilize, and/or publish some events, all events, or groups of events, depending on a level of granularity for which the event module 130 is to match events to context information. Thus, given a stream of different events occurring within different communication channels 110, the context manager 220, comparing event context information to the event stream, may select a subset of event data to match to the context information.

Thus, in some embodiments, the context manager 220 selectively matches context information (along with a member identifier) received from a communication channel within which a user is interacting, in real-time, to a stream of database entries that represent occurrences of events (also in real-time) for the user at other communication channels 110. As described herein, the systems and methods, via the event module 130, may then dynamically modify, adjust, or change various interactions within the communication channel interacting with the user.

Figure 3:
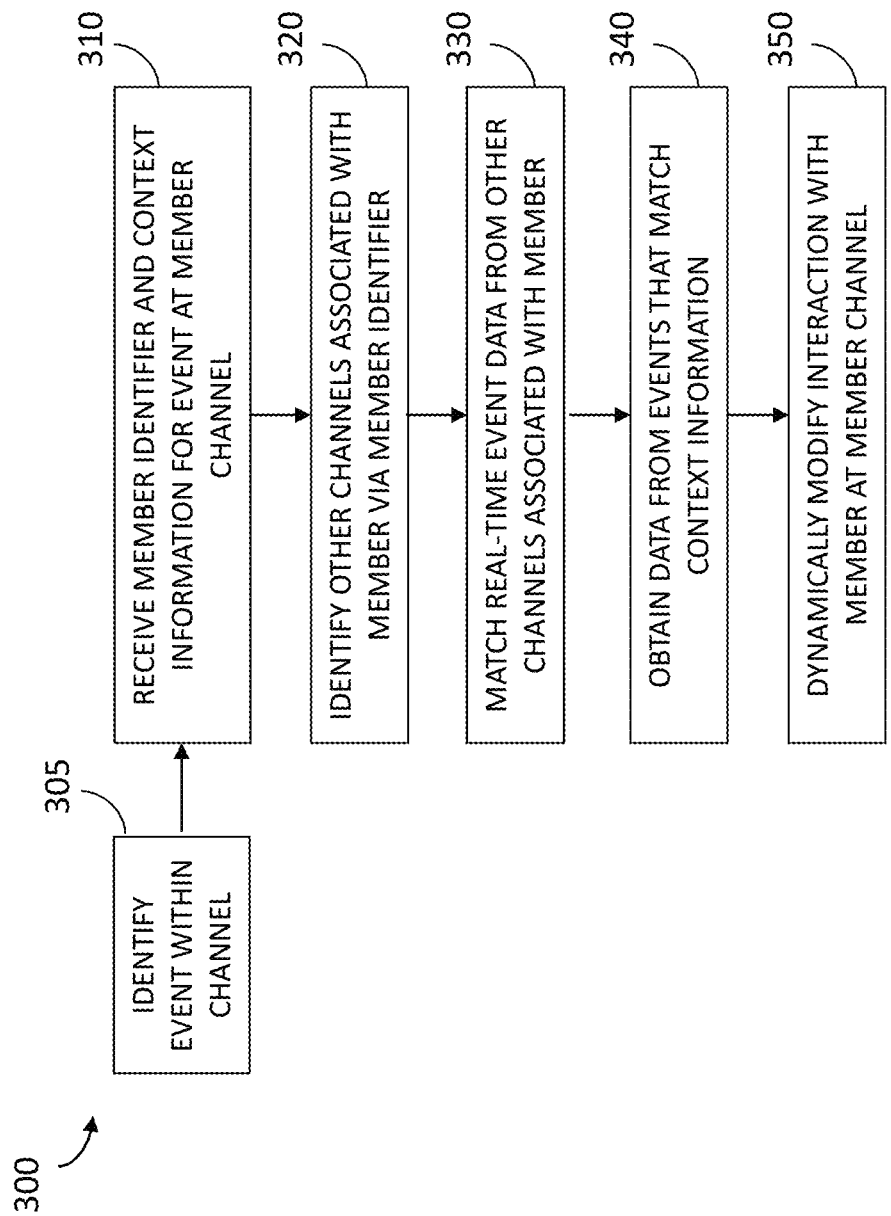
FIG. 3 is a flow diagram illustrating a method of modifying a channel interaction based on real-time event data within other communication channels.

FIG. 3 is a flow diagram illustrating a method 300 of modifying a channel interaction based on real-time event data within other communication channels. The method 300 may be performed by the event module 130, and, accordingly, is described herein merely by way of reference thereto. It will be appreciated that the method 300 may be performed on any suitable hardware.

In operation 305, an interactive system of a communication channel identifies, in real-time, an event within a first communication channel that facilitates interactions between a member and the interactive system. For example, the communication channel 110 (via an event listener), may identify that a navigation or process action occurred within the communication channel 110.

In operation 310, the event module 130 receives a member identifier for the member and context information associated with the event at the server. For example, the event module 130 may publish the API 210 to facilitate the reception of event notifications from the various communication channels.

In operation 320, the event module 130 identifies other communication channels associated with the member based on the received member identifier. For example, the context manager 220 may access the member database to identify communication channels within which the member has interacted with the server 105.

In some cases, the context manager 220 may receive member identifiers along with the context information for users interacting with a first communication channel, and match the member identifiers to member identifiers stored in a member interaction database (which includes entries that relate members to real-time event occurrences within the first communication channel and other communication channels).

In operation 330, the event module 130 matches the member identifier and the context information with events associated with the member within the identified communication channels. For example, the context manager 220 may compare the received context information with events captured, in real-time, within the other communication channels, and match the context information to the events that satisfy the context of the initial event interaction. The context manager 220 may then compare the context information received from the communication channel to events attributed to the member identifier and occurring, in real-time, within the other communication channel, and stored the matched data in the event database 140.

In operation 340, the event module 130 obtains data associated with the events within the second communication channel. For example, the event listener may access the event database 140 to obtain information for events that match the context information.

In operation 350, the event module 130 modifies, in real-time, the interactions between the member of the entity and the interactive system within the first communication channel based on the obtained data for the events within the other communication channels. The event module 130 may then update the event database 140 to include information associated with the modified interaction.

FIGS. 4A-4D illustrate an example interaction with a member via a communication channel that has been dynamically modified based on events within other communication channels.

Figure 4A:
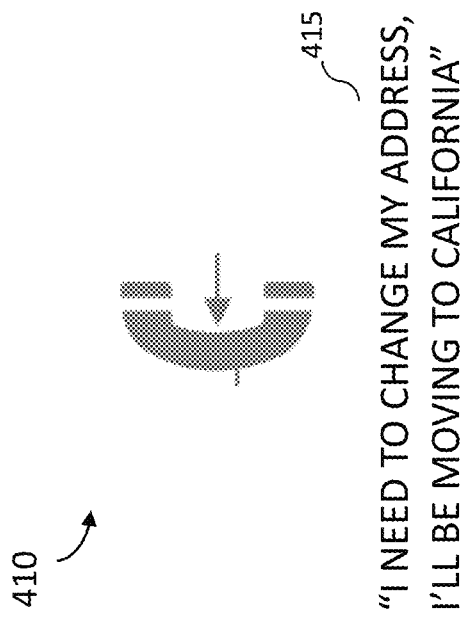
FIGS. 4A-4D are display diagrams illustrating example user interfaces presented when interacting with a user within a communication channel.

FIG. 4A depicts an event within the IVR communication channel 112. As shown, a member is interacting with an IVR system 410, and states "I need to change my address, I'll be moving to California." The system identifies the utterance as an event 415 (e.g., a navigation event to invoke an address change via the IVR system 410), and sends an event notification that includes an identifier for the member and context information associated with the "change of address."

Figure 4B:
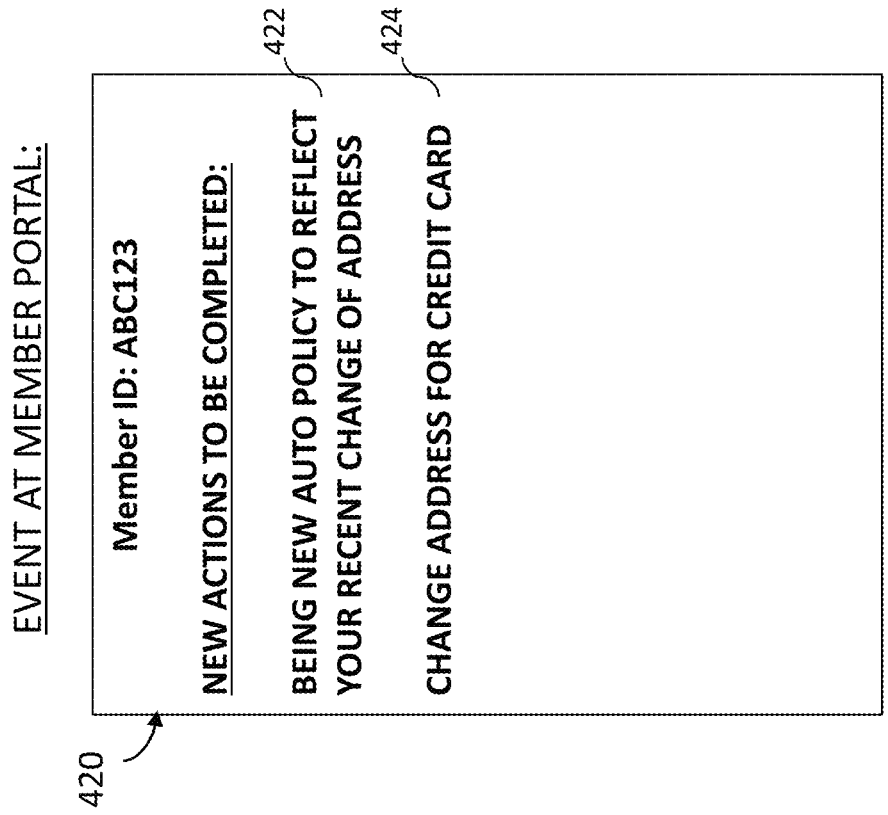

FIG. 4B depicts a user interface 420 at a different communication channel, such as the mobile application channel 118. The event module 130 matches the address change context information from the IVR channel 112 to real-time event data within the mobile application channel 118, such as by launching new action processes 422, 424, to be performed by the member in response to the address change event at the IVR channel 112. For example, the user interface 420 depicts a "new auto policy" action process 422 based on the address change context, and a "billing address change" action process 424 based on the address change context.

Figure 4C:
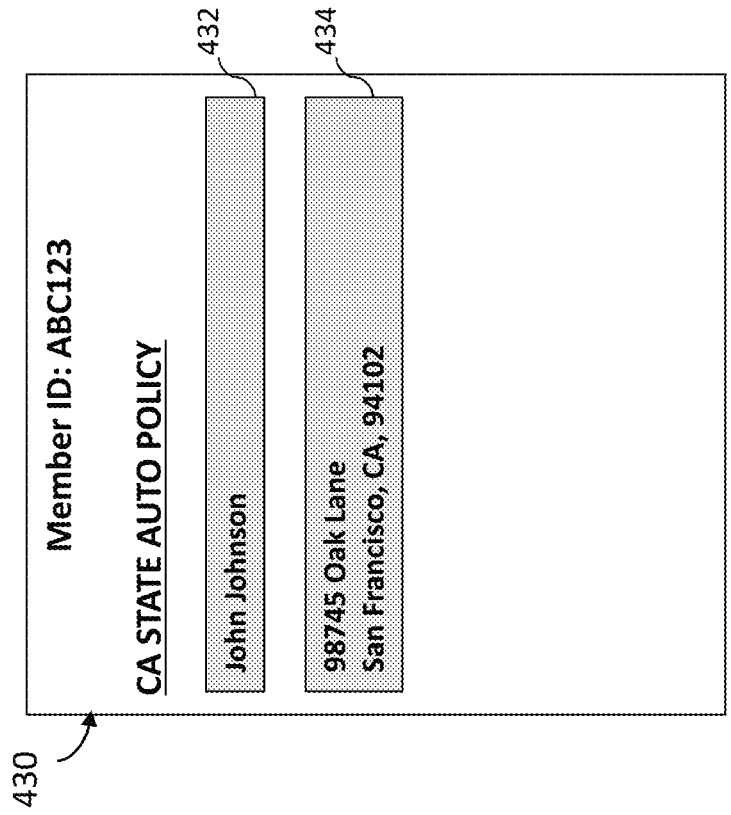

FIG. 4C depicts a user interface 430 that facilitates the new auto policy action process 422 to be performed by the member via the mobile application channel 118. The interface 430 includes various user information, such as name information 432 and address information 434. As described herein, the mobile application accesses, in real-time, the address information 434 provided within the IVR channel 112 from the event module 130, and modifies the interaction within the mobile application channel 118 by pre-populating the form with the new address information (in order to create the new policy documents).

Figure 4D:
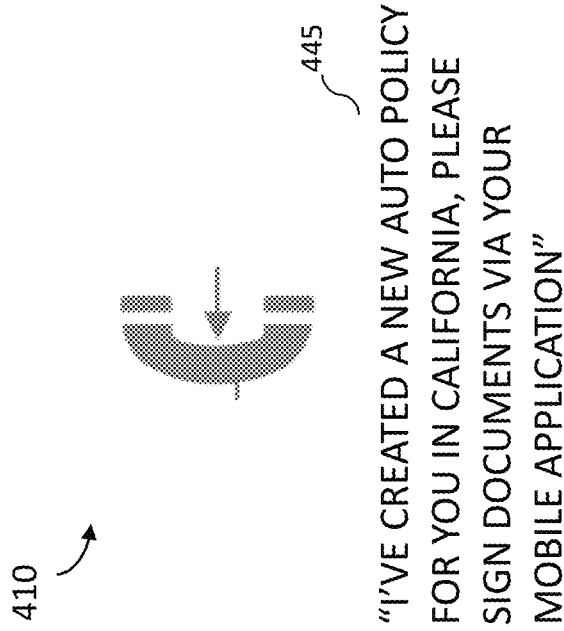

FIG. 4D depicts an event within the IVR communication channel 112. The IVR system 410 (of FIG. 4A) may then access event information associated with the mobile application, such as the creation of the new policy documents), and modify its interaction with the member. For example, the event module 130 may identify the newly created policy document as an event within the mobile application channel 118, and publish the event notification. The IVR system 112 may then announce to the user—"I've created a new auto policy for you in California, please sign documents via your mobile application" as event 445. Thus, the IVR system 112 updates the member with process events performed within the mobile application channel 118.

Of course, the systems and methods may modify interaction in a variety of different scenarios. Example scenarios include:

Modifying the guidance or tutorial provided to a member via one channel based on events within another channel (e.g., a user is interacting with an IVR system to get assistance in using a mobile application feature);

Informing the user of potential fraud activity (occurring via one channel) based on an indication from the user of a potential fraud (e.g., stolen identity) within another channel;

Providing a universal authentication engine (UAE) and authenticating a user to interact with one channel based on input provided via another channel (e.g., the IVR system only authorizes communications with the user after receiving a unique code (perhaps provided by the system) or fingerprint via the mobile application); and so on.

Thus, in some embodiments, the systems and methods facilitate the cross channel sharing of information in real-time, enabling an entity that provides various different services and products to members to leverage one interaction with the entity in order to enhance or modify other interactions with the entity, among other benefits.

Computer System Overview

Figure 5:
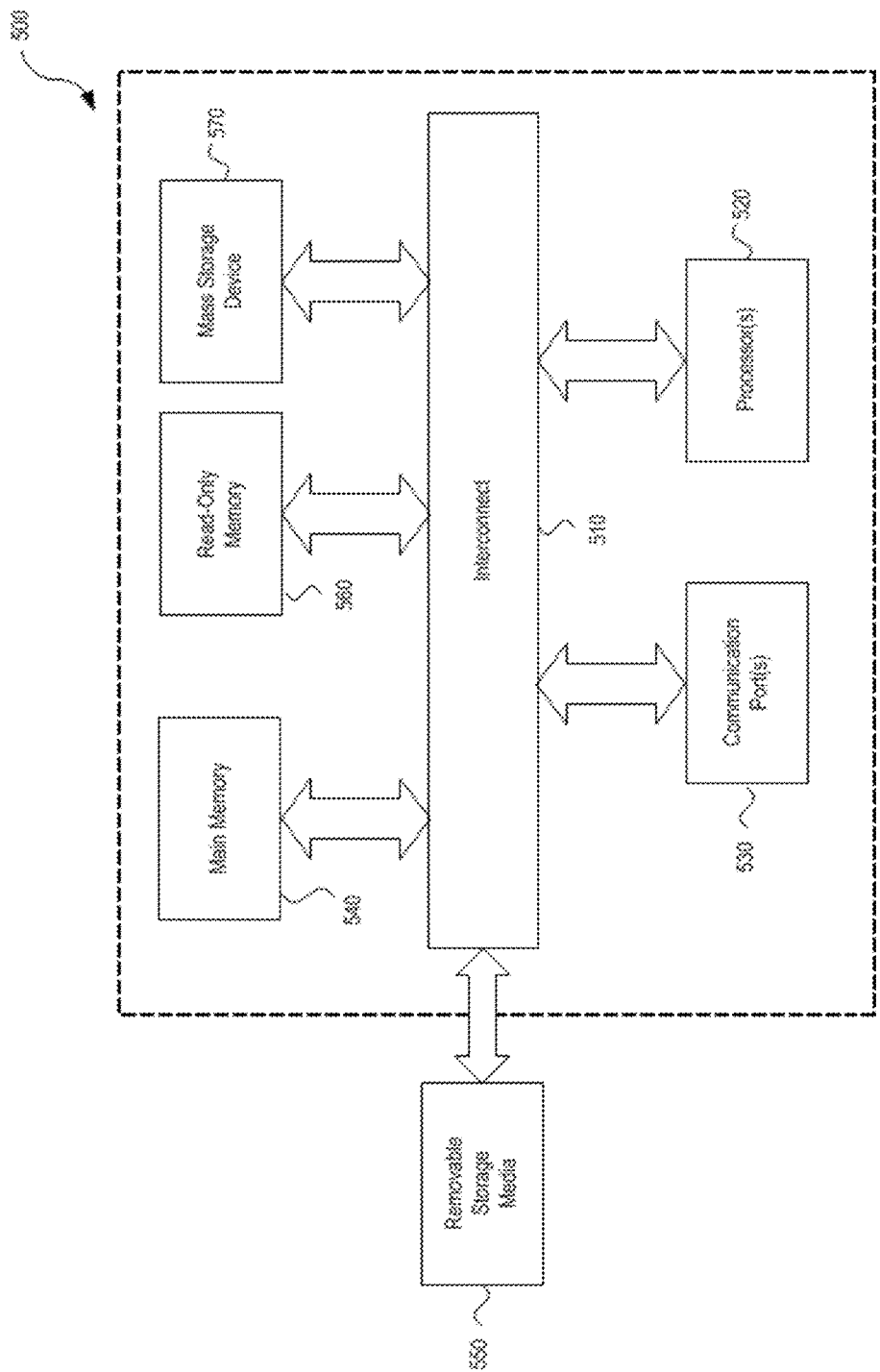
FIG. 5 illustrates an example of a computer system with which some embodiments of the present disclosure may be utilized.

Embodiments of the present disclosure include various steps and operations, which have been described above. A variety of these steps and operations may be performed by hardware components or they may be embodied in machine-executable instructions, which may be used to cause a general-purpose or special-purpose processor programmed with the instructions to perform the steps. Alternatively, the steps may be performed by a combination of hardware, software, and/or firmware. As such, FIG. 5 is an example of a computer system 500 with which embodiments of the present disclosure may be utilized. According to the present example, the computer system includes an interconnect 510, at least one processor 520, at least one communication port 530, a main memory 540, a removable storage media 550, a read-only memory 560, and a mass storage device 570.

Processor(s) 520 can be any known processor, such as, but not limited to, an Intel® Itanium® or Itanium 2® processor(s), or AMD® Opteron® or Athlon MP® processor(s), or Motorola® lines of processors. Communication port(s) 530 can be any of an RS-232 port for use with a modem-based dialup connection, a 10/100 Ethernet port, or a Gigabit port using copper or fiber. Communication port(s) 530 may be chosen, depending on a network such a Local Area Network (LAN), Wide Area Network (WAN), or any network to which the computer system 500 connects.

Main memory 540 can be random access memory (RAM) or any other dynamic storage device(s) commonly known in the art. Read-only memory 560 can be any static storage device(s), such as programmable read-only memory (PROM) chips for storing static information, such as instructions for processor(s) 520.

Mass storage device 570 can be used to store information and instructions. For example, hard disks such as the Adaptec® family of SCSI drives, an optical disc, an array of disks such as RAID, the Adaptec family of RAID drives, or any other mass storage devices may be used.

Interconnect 510 communicatively couples processor(s) 520 with the other memory, storage, and communication blocks. Interconnect 510 can be a PCI/PCI-X- or SCSI-based system bus, depending on the storage devices used.

Removable storage media 550 can be any kind of external hard-drives, floppy drives, USB drives, IOMEGA® Zip Drives, compact disc-read-only memory (CD-ROM), compact disc-re-writable (CD-RW), or digital video disc-read-only memory (DVD-ROM).

The components described above are meant to exemplify some types of possibilities. In no way should the aforementioned examples limit the disclosure, as they are only exemplary embodiments.

Terminology

Brief definitions of terms, abbreviations, and phrases used throughout this application and the appendices are given below.

The terms "connected" or "coupled" and related terms are used in an operational sense and are not necessarily limited to a direct physical connection or coupling. Thus, for example, two devices may be coupled directly or via one or more intermediary media or devices. As another example, devices may be coupled in such a way that information can be passed therebetween, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," "embodiments," and the like generally mean that the particular feature, structure, or characteristic following the phrase is included in at least one embodiment of the present disclosure and may be included in more than one embodiment of the present disclosure. In addition, such phrases do not necessarily refer to the same embodiments or to different embodiments.

If the specification states a component or feature "may," "can," "could," or "might" be included or have a characteristic, that particular component or feature is not required to be included or have the characteristic.

The term "responsive" includes completely or partially responsive.

The term "module" refers broadly to a software, hardware, or firmware (or any combination thereof) component. Modules are typically functional components that can generate useful data or other output using specified input(s). A module may or may not be self-contained. An application program (also called an "application") may include one or more modules, or a module can include one or more application programs.

The term "network" generally refers to a group of interconnected devices capable of exchanging information. A network may be as few as several personal computers on a Local Area Network (LAN) or as large as the Internet, a worldwide network of computers. As used herein, "network" is intended to encompass any network capable of transmitting information from one entity to another. In some cases, a network may be comprised of multiple networks, even multiple heterogeneous networks, such as one or more border networks, voice networks, broadband networks, financial networks, service provider networks, Internet Service Provider (ISP) networks, and/or Public Switched Telephone Networks (PSTNs) interconnected via gateways operable to facilitate communications between and among the various networks.

Also, for the sake of illustration, various embodiments of the present disclosure have herein been described in the context of computer programs, physical components, and logical interactions within modern computer networks. Importantly, while these embodiments describe various embodiments of the present disclosure in relation to modern computer networks and programs, the method and apparatus described herein are equally applicable to other systems, devices, and networks, as one skilled in the art will appreciate. As such, the illustrated applications of the embodiments of the present disclosure are not meant to be limiting, but instead are examples. Other systems, devices, and networks to which embodiments of the present disclosure are applicable include, but are not limited to, other types of communication and computer devices and systems. More specifically, embodiments are applicable to communication systems, services, and devices such as cell phone networks and compatible devices. In addition, embodiments are applicable to all levels of computing, from the personal computer to large network mainframes and servers.

In conclusion, the present disclosure discloses novel systems, methods, and arrangements for authentication of calling parties for simultaneous voice and data communications with multiple parties over multiple electronic mediums including a variety of electronic devices. While detailed descriptions of one or more embodiments of the disclosure have been given above, various alternatives, modifications, and equivalents will be apparent to those skilled in the art without varying from the spirit of the disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof. Therefore, the above description should not be taken as limiting.

What is claimed is:

1. A system supported by a server, the system comprising:
    multiple communication channels, including:
        a first communication channel that interacts with a user via an interactive voice response system; and
        a second communication channel that interacts with the user via a web portal or mobile application provided by a mobile device associated with the user;
    an event module, wherein the event module is configured to:
        identify, in real-time, an event of the user that triggers a change in account information of the user during interactions within the first communication channel;
        receive context information associated with the event during the interactions within the first communication channel;
        match the context information with the event within the second communication channel;
        obtain data associated with the event from the user via the web portal or mobile application within the second communication channel; and
        generate, in real-time, a message to the user within the first communication channel based on the obtained data for the event within the second communication channel.

2. The system of claim 1, wherein the event module includes a context manager that is configured to:
    receive member identifiers along with the context information the user interacting with the first communication channel;
    match the member identifiers to member identifiers stored in a member interaction database,
        wherein the member interaction database maintains entries that relate members to real-time event occurrences within the first communication channel and the second communication channel; and
    for each matched member identifier, compare the context information received from the first communication channel to events attributed to the member identifier and occurring, in real-time, within the second communication channel.

3. The system of claim 1, wherein the event module receives the context information associated with the event during the interactions within the first communication channel via an application programming interface called by the first communication channel.

4. The system of claim 1, wherein an occurrence of the event within the interactive voice response system is defined by one or more business rules applied to user interactions within the first communication channel.

5. The system of claim 1, wherein an occurrence of the event within the first communication channel or the second communication channel is based on the user interacting with the interactive voice response system and the products or services associated with the user and provided to the user by an entity associated with the server.

6. The system of claim 1, wherein an occurrence of the event within the first communication channel includes one or more words spoken by the user and received by the interactive voice response system.

7. The system of claim 1, wherein an occurrence of the event within the second communication channel includes actions performed by the user via the web portal or mobile application.

8. The system of claim 1, wherein an event is based on the user performing a navigation action within a communication channel.

9. The system of claim 1, wherein the event is based on processes performed by the server on behalf of the user and associated with products or services provided to the user by an entity associated with the server.

10. A method performed by a server associated with an entity that provide products or services to members, the method comprising:
    identifying, in real-time, an event that triggers a change in account information of a member of the entity within a first communication channel provided by the server to facilitate interactions between the member of the entity and an interactive system of the entity;
    receiving a member identifier for the member and context information associated with the event at the server;
    matching the member identifier and the context information with the event associated with the member within a second, different, communication channel;
    obtaining data associated with the event within the second communication channel; and
    generating, in real-time, a message to the member within the first communication channel based on the obtained data for the event within the second communication channel.

11. The method of claim 10, wherein the first communication channel interacts with the member via an interactive voice response system; and wherein the second communication channel interacts with the member via a web portal or mobile application provided by a mobile device of the member.

12. The method of claim 10, wherein the first communication channel interacts with the member via a web portal or mobile application provided by a mobile device of the member; and wherein the second communication channel interacts with the member via an interactive voice response system.

13. The method of claim 10, wherein identifying, in real-time, the event within a first communication channel includes identifying a navigation action performed by the member while interacting with the interactive system.

14. The method of claim 10, wherein identifying, in real-time, the event within a first communication channel includes identifying a process performed by the interactive system.

15. The method of claim 10, wherein matching the member identifier and the context information with the event associated with the member within the second communication channel includes:
  tracking, in real-time, every event that occurs within the second communication channel that is associated with the member;
  updating an event database for the member with the tracked events; and
  comparing the member identifier and the context information to event data stored within the updated event database to identify one or more events that occurred within the second communication channel that match the context information.

16. A non-transitory computer-readable medium whose contents, when executed by a server associated with an entity that provide products or services to members, cause the server to perform a method, the method comprising:
  receiving a member identifier for a member of the entity and context information associated with an event that triggers a change in account information associated with the member,
    wherein the event is identified in real-time within a first communication channel provided by the server to facilitate interactions between the member of the entity and an interactive system of the entity;
  matching the member identifier and the context information with events associated with the member within a second, different, communication channel;
  obtaining data associated with the events within the second communication channel; and
  generating, in real-time, a message to the member within the first communication channel based on the obtained data for the events within the second communication channel.

17. The non-transitory computer-readable medium of claim 16, wherein the first communication channel interacts with the member via an interactive voice response system; and wherein the second communication channel interacts with the member via a web portal or mobile application provided by a mobile device of the member.

18. The non-transitory computer-readable medium of claim 16, wherein the first communication channel interacts with the member via a web portal or mobile application provided by a mobile device of the member; and wherein the second communication channel interacts with the member via an interactive voice response system.

19. The non-transitory computer-readable medium of claim 16, wherein the event within the first communication channel includes a navigation action performed by the member while interacting with the interactive system.

20. The non-transitory computer-readable medium of claim 16, wherein matching the member identifier and the context information with events associated with the member within the second communication channel includes:
  tracking, in real-time, every event that occurs within the second communication channel that is associated with the member;
  updating an event database for the member with the tracked events; and
  comparing the member identifier and the context information to event data stored within the updated event database to identify one or more events that occurred within the second communication channel that match the context information.

* * * * *